(12) United States Patent
Nilsson

(10) Patent No.: US 12,052,795 B2
(45) Date of Patent: *Jul. 30, 2024

(54) CONTENT PUBLISHING SYSTEMS AND METHODS

(71) Applicant: Intertrust Technologies Corporation, Milpitas, CA (US)

(72) Inventor: Jarl A. Nilsson, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,986

(22) Filed: Dec. 22, 2021

(65) Prior Publication Data

US 2022/0141640 A1  May 5, 2022

Related U.S. Application Data

(63) Continuation of application No. 16/295,625, filed on Mar. 7, 2019, now Pat. No. 11,218,866, which is a
(Continued)

(51) Int. Cl.
*H04W 8/02* (2009.01)
*G06F 16/29* (2019.01)
(Continued)

(52) U.S. Cl.
CPC .............. *H04W 8/02* (2013.01); *G06F 16/29* (2019.01); *G06F 16/9537* (2019.01);
(Continued)

(58) Field of Classification Search
CPC ...... G01C 21/20; G01C 21/206; G01C 21/32; G09B 29/10; G09B 29/00; G06F 17/00;
(Continued)

(56) References Cited

U.S. PATENT DOCUMENTS 6,530,841 B2    3/2003  Bull et al.
6,811,084 B2   11/2004  Tatsuta et al.
(Continued)

FOREIGN PATENT DOCUMENTS

CN    1391388 A    1/2003
CN    1487762 A    4/2004
(Continued)

OTHER PUBLICATIONS

PCT International Search Report and Written Opinion mailed Nov. 19, 2008 for related International Application No. PCT/US2008/009111.
(Continued)

*Primary Examiner* — Khawar Iqbal
(74) *Attorney, Agent, or Firm* — Finnegan, Henderson, Farabow, Garrett & Dunner, LLP

(57) ABSTRACT

A system for publishing digital content is described which, in one embodiment, includes a beacon device associated with a first user configured to transmit identification information and information indicating its current position. A browsing device includes a display configured and adapted to display to a second user a representation of a local geographical area, and to selectively display to the second user content information associated with the first user, based at least in part on whether the location of the beacon device is within the local geographical area.

17 Claims, 8 Drawing Sheets

Related U.S. Application Data continuation of application No. 15/664,683, filed on Jul. 31, 2017, now Pat. No. 10,271,197, which is a continuation of application No. 14/058,416, filed on Oct. 21, 2013, now Pat. No. 10,051,457, which is a continuation of application No. 12/180,208, filed on Jul. 25, 2008, now Pat. No. 8,565,781.

(60) Provisional application No. 60/952,492, filed on Jul. 27, 2007.

(51) Int. Cl.
  *G06F 16/9537* (2019.01)
  *G06Q 30/02* (2023.01)
  *H04M 3/42* (2006.01)
  *H04M 3/487* (2006.01)

(52) U.S. Cl.
  CPC ........ *G06Q 30/02* (2013.01); *H04M 3/42348* (2013.01); *H04M 3/4878* (2013.01); *H04M 3/42042* (2013.01); *H04M 3/42093* (2013.01); *H04M 2201/38* (2013.01); *H04M 2203/253* (2013.01); *H04M 2242/14* (2013.01); *H04M 2242/15* (2013.01); *H04M 2242/30* (2013.01)

(58) Field of Classification Search
  CPC ........ G06F 3/00; G06F 16/29; G06F 16/9537; G08G 1/123; H04W 8/02; G06Q 30/02; H04M 3/42348; H04M 3/4878; H04M 2242/30; H04M 3/42093; H04M 2201/38; H04M 2203/253; H04M 2242/14; H04M 2242/15; H04M 3/42042
  See application file for complete search history.

(56) References Cited

U.S. PATENT DOCUMENTS

| | | | |
|---|---|---|---|
| 7,275,994 B2 | 10/2007 | Eck et al. | |
| 7,435,179 B1 | 10/2008 | Ford | |
| 7,491,123 B2 | 2/2009 | Smith | |
| 7,502,862 B2 | 3/2009 | Sahuc et al. | |
| 7,564,469 B2 | 7/2009 | Cohen | |
| 7,598,855 B2 | 10/2009 | Scalisi et al. | |
| 7,751,971 B2 | 7/2010 | Chang et al. | |
| 7,870,190 B2 | 1/2011 | Takahura et al. | |
| 7,946,919 B2 | 5/2011 | Piccionelli | |
| 7,958,453 B1 | 6/2011 | Taing | |
| 7,970,749 B2 | 6/2011 | Uhlir et al. | |
| 8,002,617 B1 | 8/2011 | Uskela et al. | |
| 8,024,758 B2 | 9/2011 | Byun et al. | |
| 8,060,499 B2 | 11/2011 | Mansikkaniemi | |
| 8,070,608 B2 | 12/2011 | Uhlir | |
| 8,108,459 B1 | 1/2012 | Hoffman et al. | |
| 8,139,514 B2 | 3/2012 | Weber et al. | |
| 8,190,733 B1 | 5/2012 | Hoffman et al. | |
| 8,204,684 B2 | 6/2012 | Forstall et al. | |
| 8,224,355 B2 | 7/2012 | Beydler et al. | |
| 8,267,794 B2 | 9/2012 | Van Luchene | |
| 8,287,383 B1 | 10/2012 | Etter et al. | |
| 8,291,016 B1 | 10/2012 | Whitney et al. | |
| 8,308,568 B2 | 11/2012 | Amaitis et al. | |
| 8,366,446 B2 | 2/2013 | Kreiner et al. | |
| 8,452,307 B1 | 5/2013 | Fujisaki | |
| 8,463,238 B2 | 6/2013 | Forstall et al. | |
| 8,483,712 B2* | 7/2013 | Hamynen | H04N 21/4223 455/456.2 |
| 8,694,026 B2 | 4/2014 | Forstall et al. | |
| 8,694,028 B2 | 4/2014 | Inukai | |
| 8,756,501 B1* | 6/2014 | Karam | G06F 3/048 715/764 |
| 8,769,393 B1 | 7/2014 | Abhyanker | |
| 8,775,328 B1 | 7/2014 | Abhyanker | |
| 9,014,076 B2 | 4/2015 | Weber et al. | |
| 9,098,545 B2 | 8/2015 | Abhyanker | |
| 9,109,904 B2 | 8/2015 | Forstall et al. | |
| 9,277,366 B2 | 3/2016 | Busch | |
| 9,319,471 B2* | 4/2016 | Diem | H04W 4/80 |
| 9,357,345 B2 | 5/2016 | Roskind et al. | |
| 9,459,622 B2 | 10/2016 | Abhyanker | |
| 9,544,075 B2 | 1/2017 | Altman et al. | |
| 9,797,737 B2* | 10/2017 | Jung | G01C 21/34 |
| 10,508,921 B2* | 12/2019 | Forstall | G01C 21/3807 |
| 2001/0009867 A1 | 7/2001 | Sakaguchi et al. | |
| 2002/0090985 A1 | 7/2002 | Tochner et al. | |
| 2003/0008671 A1 | 1/2003 | Lundgren et al. | |
| 2003/0036428 A1 | 2/2003 | Aasland | |
| 2003/0224855 A1 | 12/2003 | Cunningham | |
| 2004/0029625 A1 | 2/2004 | Annunziata | |
| 2004/0038665 A1 | 2/2004 | Hosono | |
| 2004/0058732 A1 | 3/2004 | Piccionelli | |
| 2004/0255268 A1 | 12/2004 | Meijer et al. | |
| 2005/0027705 A1 | 2/2005 | Sadri et al. | |
| 2005/0049022 A1 | 3/2005 | Mullen | |
| 2005/0143053 A1 | 6/2005 | Virtanen et al. | |
| 2006/0022048 A1 | 2/2006 | Johnson | |
| 2006/0069503 A1 | 3/2006 | Suomela et al. | |
| 2006/0071783 A1* | 4/2006 | Culpepper | G08B 21/0269 340/539.13 |
| 2006/0105838 A1 | 5/2006 | Mullen | |
| 2006/0220840 A1 | 10/2006 | Culpepper et al. | |
| 2006/0255935 A1 | 11/2006 | Scalisi et al. | |
| 2006/0256959 A1* | 11/2006 | Hymes | H04W 4/21 379/433.04 |
| 2006/0258420 A1 | 11/2006 | Mullen | |
| 2006/0281553 A1 | 12/2006 | Hawkins et al. | |
| 2006/0284789 A1 | 12/2006 | Mullen | |
| 2006/0287026 A1 | 12/2006 | Mullen | |
| 2007/0021166 A1 | 1/2007 | Mattila | |
| 2007/0060408 A1 | 3/2007 | Schultz et al. | |
| 2007/0085759 A1 | 4/2007 | Lee et al. | |
| 2007/0104348 A1 | 5/2007 | Cohen | |
| 2007/0149284 A1 | 6/2007 | Plavetich et al. | |
| 2007/0204218 A1 | 8/2007 | Weber | |
| 2007/0229350 A1 | 10/2007 | Scalisi et al. | |
| 2007/0233367 A1 | 10/2007 | Chen et al. | |
| 2007/0273558 A1 | 11/2007 | Smith et al. | |
| 2007/0281765 A1 | 12/2007 | Mullen | |
| 2007/0281766 A1 | 12/2007 | Mullen | |
| 2007/0296574 A1 | 12/2007 | Smith et al. | |
| 2008/0015018 A1 | 1/2008 | Mullen | |
| 2008/0015024 A1 | 1/2008 | Mullen | |
| 2008/0028063 A1 | 1/2008 | Holmes et al. | |
| 2008/0040678 A1 | 2/2008 | Crump | |
| 2008/0040684 A1 | 2/2008 | Crump | |
| 2008/0051033 A1* | 2/2008 | Hymes | H04W 4/02 455/47 |
| 2008/0071559 A1 | 3/2008 | Arrasvuori | |
| 2008/0088438 A1 | 4/2008 | Aninye et al. | |
| 2008/0129491 A1 | 6/2008 | Ruperto | |
| 2008/0146338 A1 | 6/2008 | Bernard et al. | |
| 2008/0165148 A1 | 7/2008 | Williamson et al. | |
| 2008/0171559 A1 | 7/2008 | Frank et al. | |
| 2008/0172173 A1* | 7/2008 | Chang | H04L 67/52 455/456.3 |
| 2008/0186164 A1 | 8/2008 | Emigh et al. | |
| 2009/0005140 A1 | 1/2009 | Rose et al. | |
| 2009/0017913 A1 | 1/2009 | Bell et al. | |
| 2009/0018769 A1 | 1/2009 | Poliak | |
| 2009/0024986 A1 | 1/2009 | Meijer et al. | |
| 2009/0281851 A1 | 11/2009 | Newton et al. | |
| 2010/0287011 A1 | 11/2010 | Muchkaev | |
| 2010/0331089 A1 | 12/2010 | Priebatsch et al. | |
| 2011/0004658 A1 | 1/2011 | Chesley et al. | |
| 2011/0081973 A1 | 4/2011 | Hall | |
| 2011/0214047 A1 | 9/2011 | Pilskalns | |
| 2011/0319148 A1 | 12/2011 | Kinnebrew et al. | |
| 2012/0052953 A1 | 3/2012 | Annambhotla et al. | |
| 2012/0094770 A1 | 4/2012 | Hall | |
| 2012/0157210 A1 | 6/2012 | Hall | |
| 2012/0166972 A1 | 6/2012 | Weber et al. | |
| 2012/0185892 A1 | 7/2012 | Camplejohn et al. | |
| 2012/0190452 A1 | 7/2012 | Weston et al. | |

(56) References Cited

U.S. PATENT DOCUMENTS

| | | |
|---|---|---|
| 2012/0216139 A1 | 8/2012 | Ording et al. |
| 2012/0226627 A1 | 9/2012 | Yang |
| 2012/0231887 A1 | 9/2012 | Lee et al. |
| 2012/0233258 A1 | 9/2012 | Vijayaraghavan et al. |
| 2012/0246104 A1 | 9/2012 | Di Sciullo et al. |
| 2012/0315992 A1 | 12/2012 | Gerson et al. |
| 2013/0004932 A1 | 1/2013 | Mahajan et al. |
| 2013/0005475 A1 | 1/2013 | Mahajan et al. |
| 2013/0005480 A1 | 1/2013 | Bethke et al. |
| 2013/0053002 A1* | 2/2013 | Hymes ............... H04W 4/20 455/414.1 |
| 2013/0072308 A1 | 3/2013 | Peck et al. |
| 2013/0102329 A1* | 4/2013 | Forstall ............ H04M 1/72427 455/456.3 |
| 2013/0117326 A1 | 5/2013 | De Smet et al. |
| 2013/0157691 A1 | 6/2013 | Beydler et al. |
| 2013/0178257 A1 | 7/2013 | Langseth |
| 2013/0337916 A1 | 12/2013 | Saretto et al. |
| 2015/0032368 A1 | 1/2015 | Geelen et al. |
| 2015/0302018 A1 | 10/2015 | Butler |
| 2015/0371439 A1 | 12/2015 | Kinman et al. |
| 2018/0101933 A1* | 4/2018 | Rasmussen ............. G06T 17/05 |

FOREIGN PATENT DOCUMENTS

| | | |
|---|---|---|
| EP | 1574238 A1 | 9/2005 |
| EP | 2101889 | 9/2009 |
| EP | 2393056 A1 | 12/2011 |
| EP | 2416289 A1 | 2/2012 |
| JP | 2001-336948 | 12/2001 |
| JP | 2002-063112 | 2/2002 |
| JP | 2002-271839 | 9/2002 |
| JP | 2002-297474 | 10/2002 |
| JP | 2003-337818 | 11/2003 |
| JP | 2004-054316 | 2/2004 |
| KR | 2003-0081035 | 10/2003 |
| KR | 2006-0081460 | 7/2006 |
| KR | 2006-0083201 | 7/2006 |
| WO | WO 2002/062436 | 8/2002 |
| WO | WO 2005/024667 A1 | 3/2005 |
| WO | WO 2008/076764 A1 | 6/2008 |

OTHER PUBLICATIONS

English translation of First Chinese Office Action mailed Aug. 16, 2012 for Chinese Patent Application No. 200880109377.3.
English translation of Second Chinese Office Action mailed Apr. 24, 2013 for Chinese Patent Application No. 200880109377.3.
European First Examination Report dated Mar. 13, 2013, issued in European Application No. 08794802.2.
International Preliminary Report on Patentability mailed Feb. 11, 2010, issued in International Application No. PCT/US2008/009111.
Mexican Office Action dated Oct. 18, 2011, issued in Mexican Application No. MX/a/2010/001101 (2 pages).
Japanese First Office Action dated May 8, 2012, issued in Japanese Application No. 2010-518240 (5 pages).
Canadian First Office Action mailed Nov. 25, 2013 for Canadian Patent Application No. 2,694,200.
Notice of Grounds for Rejection, issued by Korean Intellectual Property Office in Korean Patent Application No. 2010-7004000, mailed Sep. 11, 2014, with English translation (20 pages).
Matyas, "Playful Geospatial Data Acquisition by Location-Based Gaming Communities"; The International Journal of Virtual Reality; 2007; vol. 6, No. 3; pp. 1-10.
http://klout.com/corp/klout_score; 4 pages; retrieved Aug. 23, 2016.
www.empireavenue.com/about/; 1 page; retrieved Aug. 23, 2016.
Indian First Examination Report mailed May 26, 2017 for Indian Patent Application No. 364/KOLNP/2010 (4 pages).
European Official Communication dated Jul. 17, 2017 issued in European Application No. 08794802.2 (4 pages).
European Communication under Rule 71(3) (Intention to Grant) dated Nov. 15, 2018 issued in European Application No. 08794802.2 (6 pages).

* cited by examiner

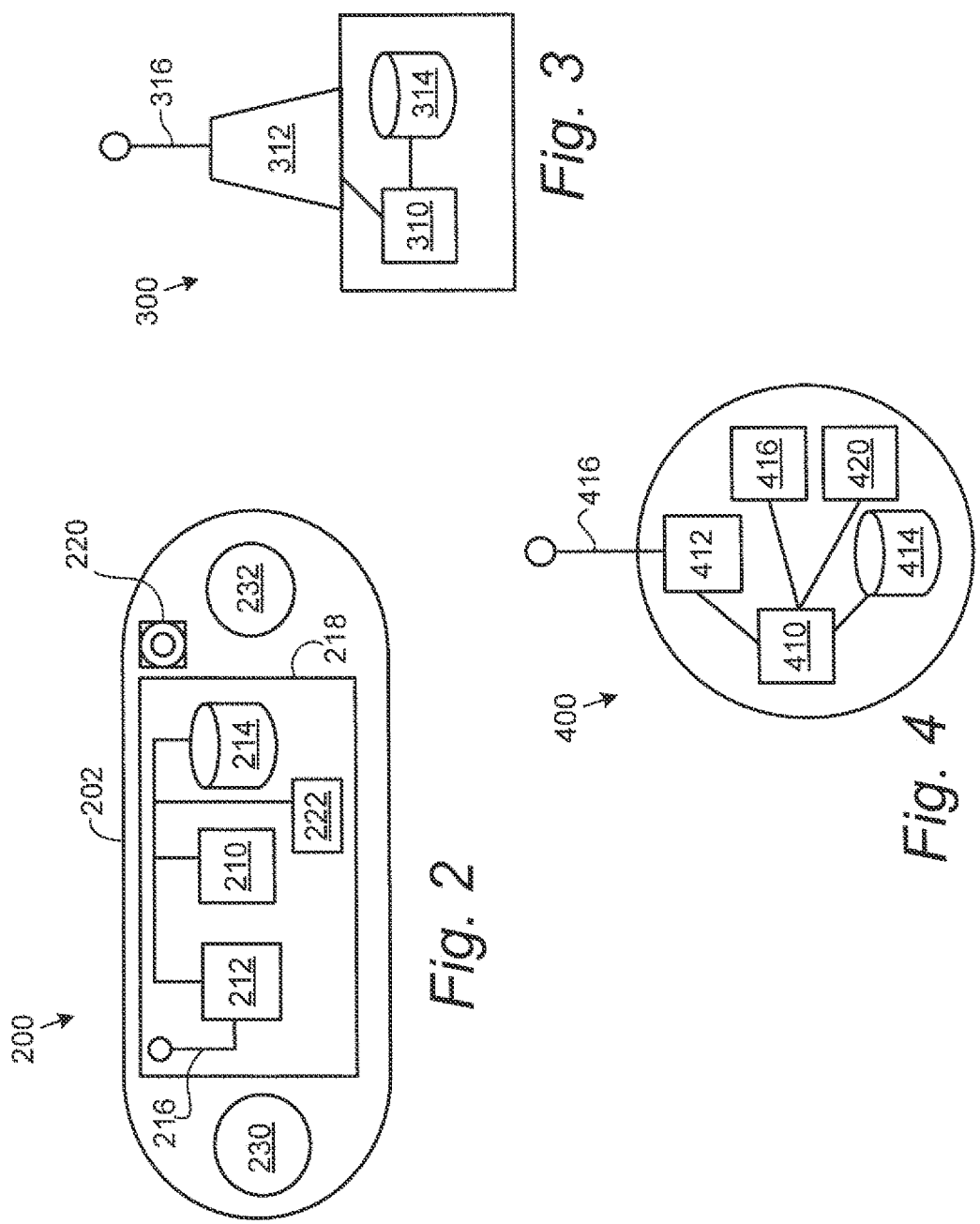

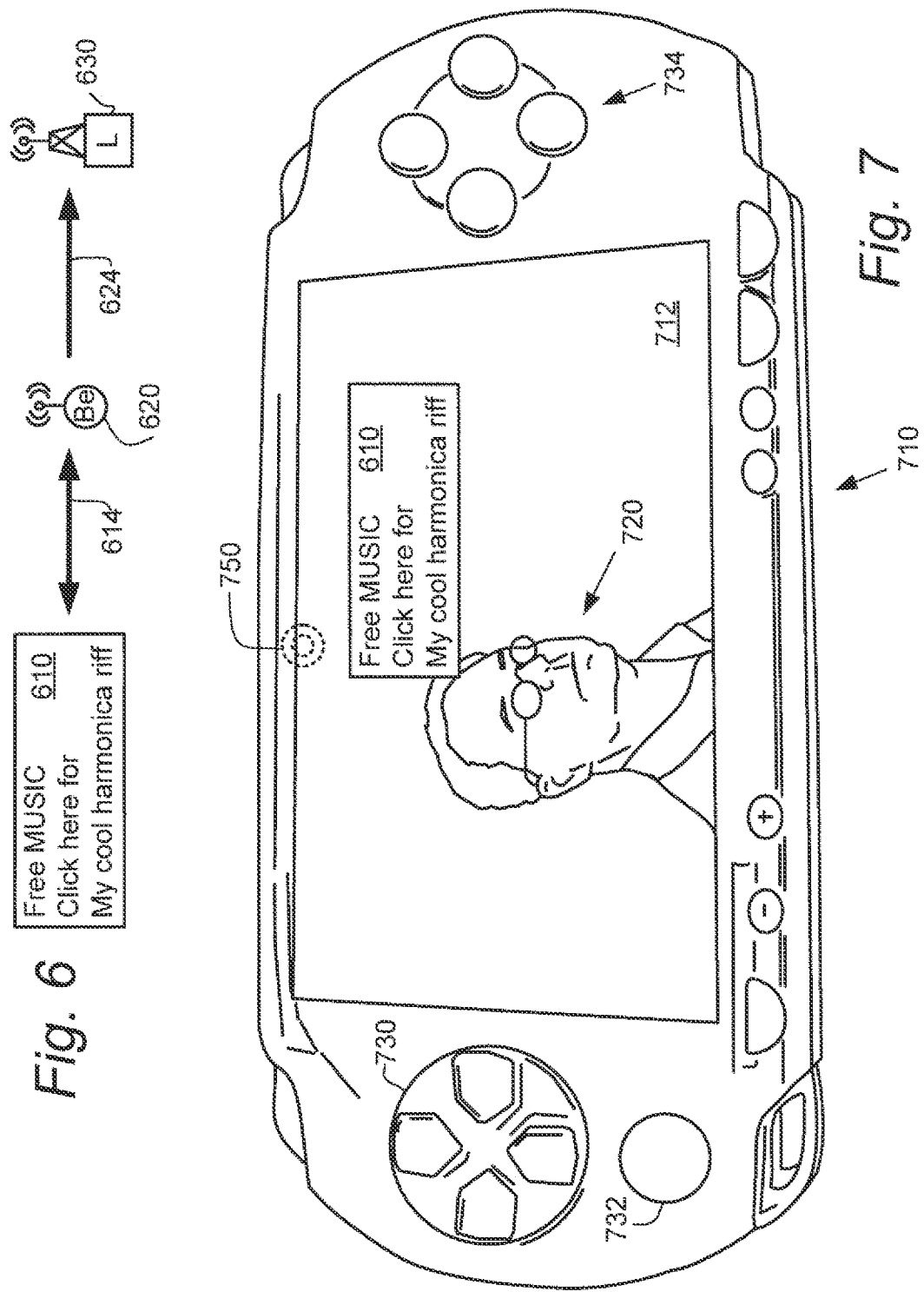

CONTENT PUBLISHING SYSTEMS AND METHODS

CROSS REFERENCE TO RELATED APPLICATIONS

This application is a continuation of U.S. patent application Ser. No. 16/295,625 filed Mar. 7, 2019, which is a continuation of U.S. patent application Ser. No. 15/664,683 (now U.S. Pat. No. 10,271,197) filed Jul. 31, 2017, which is a continuation of U.S. patent application Ser. No. 14/058,416 (now U.S. Pat. No. 10,051,457) filed Oct. 21, 2013, which is a continuation of U.S. patent application Ser. No. 12/180,208 (now U.S. Pat. No. 8,565,781) filed Jul. 25, 2008; which claims the benefit of U.S. Provisional Application No. 60/952,492, filed Jul. 27, 2007, all of which are also incorporated by reference herein.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The last few years have seen an avalanche of content published via electronic media. Blogs make it very simple to voice one's opinion on virtually any subject. Publishers such as YouTube have amassed millions of clips made by amateurs, from teenagers singing a popular song, to serious pieces about politics and current events. Many people simply want to express themselves, and have their message reach out to the public. Accordingly, systems and methods which can enable users to locate people, goods, and services in their immediate surroundings are desirable.

The internet allows a user to connect with merchants and friends all around the world. It makes no difference where a person is located geographically. While this makes world wide advertising of goods and services easy, it makes it difficult to browse the immediate surroundings, or a predefined geographic area, for interesting information. The internet can help you find a specialized part dealer on the other side of the globe, but it is not very useful when you want to browse around for a doctor in a crowd of people. Similarly, cell phone technology allows users to make and receive calls all over the world, but does very little to aid users in locating people and information in a user's immediate surroundings. Mobile navigation systems are useful in providing directions, static information about particular locations (e.g. shops and service stations near your current location), and even providing dynamic information such as traffic status on major roadways. However, as of yet there has not yet been a system for individual users to publish or advertise their own content to a localized audience.

Currently, content published on the web is accessible to anyone across the world. There is little or no possibility to publish to a given local geographic area. To some degree, the Internet has become so large that it is now difficult to browse for things that are in your local area.

SUMMARY

Systems and methods for content publishing are described herein, including systems and methods for geographically discriminated digital content publishing.

In one embodiment, a system for publishing digital content is described which includes a beacon device associated with a first user configured to transmit position information indicating the current position of the beacon device, and identification information identifying the beacon. A browsing device includes a display configured and adapted to display to a second user a representation of a local geographical area, and to selectively display to the second user, based at least in part on whether the location of the beacon device is within the local geographical area, content information associated with the first user.

In another embodiment, a system for publishing digital content is described that includes a browsing device having a display configured and adapted to display to a first user a representation of a local geographical area and content information associated with a second user, wherein the content information is displayed selectively based at least in part on the location of the second user as determined by a beacon device associated with the second user.

In another embodiment, a method for publishing digital content is described which includes displaying with a browsing device to a first user a representation of a local geographical area and content information associated with a second user, wherein the content information is displayed selectively based at least in part on the location of the second user as determined by a beacon device associated with the second user.

In another embodiment, a system for publishing digital content is described which includes a receiver system adapted and configured to repeatedly receive from a beacon device associated with a first user transmissions of position information indicating the current position of the beacon device. A processing system is configured and adapted to calculate the position of the beacon device based at least in part on the received transmissions of position information, and link content information associated with the first user with the calculated position. A transmission system is adapted and configured to selectively transmit the content information to a browsing device configured and adapted to display to a second user a local geographical area and the content information, the content information being selectively displayed based at least in part on whether the calculated position is within the local geographical area.

In another embodiment, a method for publishing digital content is described which includes repeatedly receiving from a beacon device associated with a first user, position information indicating the current position of the beacon device; and transmitting to a second user using a browsing device, a representation of a local geographical area and content information associated with the first user, wherein the content information can be displayed selectively based at least in part on whether the location of the beacon device is within the local geographical area.

In yet another embodiment, a system for publishing digital content is described which includes a beacon device associated with a first user configured to repeatedly transmit to a landscape service position information indicating the current position of the beacon device, such that the landscape service is capable of selectively transmitting content information associated with the first user to a browsing device selectively based at least in part on whether the beacon device is positioned within a geographical area local to the browsing device In another embodiment, a method for publishing digital content is described which includes repeatedly transmitting to a landscape service with a beacon device associated with a first user, position information indicating the current position of the beacon device, such that the landscape service is capable of selectively transmitting content information associated with the first user to a browsing device selectively based at least in part on whether the beacon device is positioned within a geographical area local to the browsing device.

It will be appreciated that these systems and methods are novel, as are applications thereof and many of the components, systems, and methods employed therein. It should be appreciated that embodiments of the presently described inventive body of work can be implemented in numerous ways, including as processes, apparatuses, systems, devices, methods, computer readable media, and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIG. 2 shows further detail of a browser device, in accordance with some embodiments;

FIG. 3 shows further detail of a landscape transceiver, in accordance with some embodiments;

FIG. 4 shows further detail of a beacon device, in accordance with some embodiments;

FIG. 6 shows an example of user authored content, according to some embodiments;

FIG. 7 shows an example of a browser displaying a user's content, according to one embodiment;

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body work.

Systems and methods are described for publishing and/or browsing digital content using dynamic geographical update and discrimination. Preferred embodiments enable users to advertise and browse information in a continually changing geographic environment. Users can present arbitrary information connected to their location, even as the location is changing. Goods and services can be advertised with the benefit of reaching customers within any appropriately defined local area.

The Internet allows users to connect with merchants and friends all around the world. It makes little or no difference where a person is located geographically. While this makes worldwide advertising of goods and services easy, it makes it difficult to browse one's immediate surroundings (or a predefined geographic area) for interesting information. Although the Internet can help you find a sprocket dealer on the other side of the globe, it is not as useful when you want to browse around for a doctor in a crowd of people. Embodiments of the systems and methods described herein can help ameliorate some or all of these problems, and enable users to locate people, goods, and services in their immediate surroundings.

Figure 1:
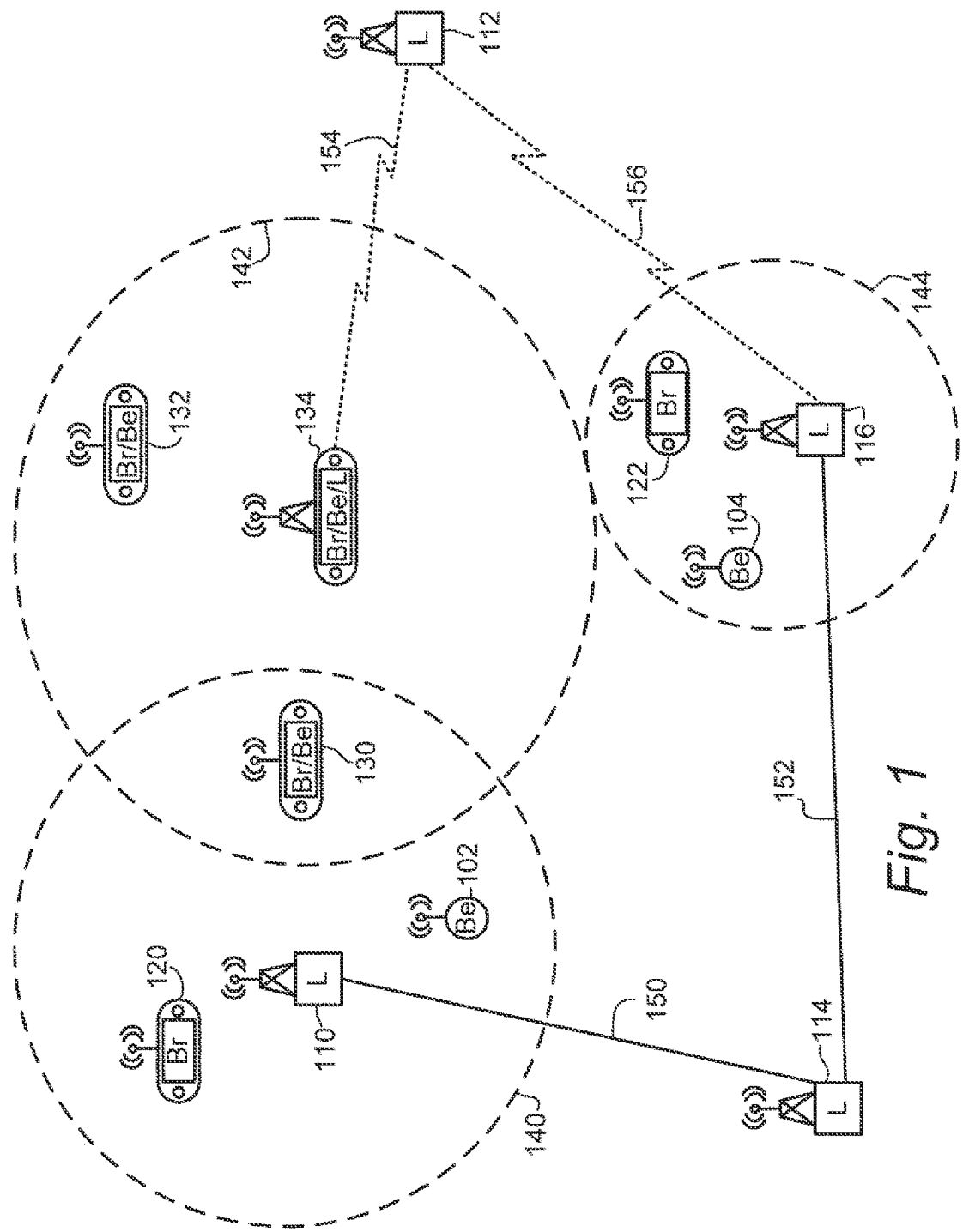
FIG. 1 illustrates various components of the system, according to several embodiments.

FIG. 1 illustrates various components of a system, according to several embodiments. In these examples, three classes of components are used: beacons, browsers, and landscape servers. Beacons, such as beacon 102 and 104 transmit identity and geographic location information to the landscape service. The landscape service comprises landscape transceivers 110, 112, 114, and 116, each of which have associated processing systems and are networked to one another. The network connection can use hard lines such as cables and/or fiber optics, denoted by solid lines 150 and 152, wireless technology such as microwave, radio wave communication, denoted by dotted lines 154 and 156, and/or combinations of these or any other suitable communications technologies. The landscape service computes information landscapes, and views into the landscapes. Browsers, such as browsers 120 and 122 retrieve information from landscape transceivers 110 and 116 respectively, about the computed landscapes and views into the landscapes from the landscape service. Computations in the browsers can further modify the view of the information landscape before it is presented to the user.

According to some embodiments, browsers, beacons, and landscape servers may reside on the same computing device, such as combination device 134, or on separate computing devices connected by a network. In other words, device 134 can contain a beacon, and all of, or part of, a landscape service, and part or all of a browser. According to other embodiments, the beacon and browser functionality can be combined into a single device such as devices 130 and 132.

A beacon registers its position and identity with the landscape service by sending a message to the landscape service. For example, the message can be sent to the landscape service with a certain frequency containing the location of the beacon obtained via a GPS system within or associated with the beacon, or it can be sent on some event such as a change in external parameters (e.g., a change in direction or speed of the beacon), or as a result of a calculation based on internal operating parameters. In FIG. 1 the beacon 102 sends its location and identity information to landscape transceiver device 110, which in turn sends the information to the other landscape devices 112, 114, 116 and device 134. Similarly, beacon 104 periodically sends its location and identity to transceiver 116, which sends the information on to the other landscape devices. By periodically sending a very small amount of data to the landscape service, the beacons thereby can operate wirelessly with very little power consumption. According to some embodiments, the beacons transmit location and identity information at time intervals of less than about one hour. According to some embodiments, the beacons transmit location and identity information at time intervals of less than about five minutes. According to some embodiments, the beacons transmit location and identity information at time intervals of less than about one minute or less than about five seconds.

In some embodiments, beacons may alternatively, or in addition, register other geographical positions than the actual position at which the beacon is located. This will make the beacon appear to be in a different geographic location in the information landscape. Similarly, in some embodiments a beacon may register with many landscape services either directly or via a proxy service to landscape services.

In one embodiment, the landscape service maintains a representation of the geographic locations of the beacons and browsers registered with this service. The landscape service provides browsers with one or more views of the information landscape. For example, browser 120 and combination device 130 register with the landscape service via transceiver 110, and browser 122 registers via transceiver 116. Each landscape transceiver has a certain range which is denoted in FIG. 1 as dashed lines 140, 142 and 144 around devices 110, 134 and 116 respectively. Landscape service ranges may overlap geographic landscapes with each other, such as in the case of range 140 and 142. Note that combination beacon and browser device 130 is within range 140 of landscape transceiver 110 and range 142 of combination device 134. Thus device 130 can register with the landscape service using either or both of transceiver 110 and device 134 simultaneously. Landscape service devices may also trade beacon information and browser information with each other on a peer-to-peer basis.

The information landscape is a representation of the geographical landscape, beacon identities and/or positions, and/or browser positions and/or directions. A landscape service operates on this representation to create information landscape views for browsers.

In one embodiment, the views the landscape service sends back to the browser devices 120, 122, 130, 132 and 134 can be in the form of delta views of the information landscape, which decreases the amount of data to be transmitted.

An information landscape view is a representation of the view from a browser's perspective. According to some embodiments, the information landscape view is processed by a processing system within the browser to create a presentation of the information landscape for the user of the browser.

The geographical size of the information landscape displayed by a browser can vary depending upon what type of information is being published or disseminated, preferences of the publishing user, the landscape service and/or the browsing user. The geographical size can also depend on a various policies as discussed in further detail below. According to some embodiments, the geographical size of the information landscape displayed by a browser is less than about 10 Km. According to some other embodiments, the geographical size is less than about 1 Km. According to some other embodiments, the geographical size is less than about 100 meters. According to some other embodiments, the geographical size is less than about 10 meters.

In one embodiment, the landscape service calculates the information landscape. The calculations can include estimation of position based on the speed and location of a beacon, and/or on estimation of the geographical conditions the beacon is traveling in, or on other external or internal parameters. Calculations can also include expected events, and check points for the beacon. In one embodiment, users can modify the parameters of the calculation.

In one embodiment, a browser provides the landscape service with a location and a direction. In return, the landscape service returns a computed view to the browser. In one embodiment, a browser can simultaneously obtain and process views from several landscape services.

Browsers, such as devices 120, 122, 130, 132 and 134 present the information landscape to the user. For example, the presentation can be computed from one or more landscape service views. In one embodiment, the views can be further computed before and/or after they are combined to a presentation.

FIG. 2 shows further detail of a browser device, in accordance with some embodiments. Browser 200 includes a housing 202 on which display 218 and camera 220 are mounted. According to some embodiments, camera 220 and display 218 are mounted on opposite sides of housing 202, such that browser 200 can display an overlay of the computed information landscape on top of suitable images representing the actual physical landscape. By using camera 220, a "camera overlay" can be displayed on display 218 in which the browser superimposes the information landscape on an image of the actual landscape in the direction the browser 200 is pointing. Browser 200 also includes a central processor 210 (that, in some embodiments, may include image processing capability), internal storage 214 (e.g., in the form of flash and/or hard disk storage), and communications processor 212 for receiving and, according to some embodiments, sending, information to and from the landscape service via antenna 216. A gps and/or other location sensor 222 is provided to detect locations and/or direction/orientation of the browser 200. User controls 230 and 232 receive input from the user of browser 200 and can include a pointing device and/or other menu navigation tools. The operation of device 200 will typically be controlled by processor 210 operating under the guidance of programs stored in memory 214. For example, memory 214 will typically include an operating system for managing the execution of applications, peripherals, and the like, software for displaying content to the user, software for processing information received from the landscape service and preparing it for display, and/or other software for performing the actions described herein.

One of ordinary skill in the art will appreciate that the systems and methods described herein can be practiced with devices similar or identical to that illustrated in FIG. 2, or with devices that do not possess some of the components shown in FIG. 2, and/or that possess other components that are not shown. Thus it should be appreciated that FIG. 2 is provided for purposes of illustration and not limitation.

Browsers may also declare geographic locations and directions other than the actual geographic location of the browser. In one embodiment, the user will in this case see a view of the information landscape from that point and in that direction.

According to one embodiment, browser 200 keeps a cache of landscape views and landscape view deltas in storage 214 in order to reduce bandwidth demands.

In one embodiment, browser 200 modifies the view calculations it receives from a landscape service. For instance, the browser may want to further restrict the depth of field, the width of angle, or the vantage point for the view.

The browser may also adjust the view calculation based on physical parameters and measurements obtained through the operation of the browser, or in response to user input.

The browser may also call on other services separate and apart from the landscape service to obtain parameters for its view calculation.

For example, a user might point the browser North by North West and indicate "Tomorrow's Weather". This information could be sent to the landscape service, which would contact a weather prognosis service to find tomorrow's weather report relative to the direction indicated by the user's browser. As a result the browser might display a raincloud in the indicated direction.

As another example, a user might instruct the browser to display homes older than 10 years with a red dot superimposed. The landscape service could contact the county's building service to find a list of the ages of buildings in the browser's vicinity, and send this information back to the browser for display.

In some embodiments, a browser may further restrict the calculated view to fit in with the presentation of the view to the user. For instance, the presentation of menus may obscure the view of the information landscape. Presentation calculations may also include images obtained from instruments other than the browser device itself, or physical parameters or operating parameters obtained from third party services.

FIG. 3 shows further detail of a landscape transceiver, in accordance with some embodiments. Landscape transceiver 300 includes a communications controller 312 that controls communication via antenna 316 and via other communication lines (not shown). Processing system 310 communicates with both communications controller 312 and storage system 314.

FIG. 4 shows further detail of a beacon device, in accordance with some embodiments. Beacon 400 includes a communication controller 412 that controls communications via antenna 416. Processing system 410 communicates with communications controller 412, internal storage 414 and location sensor 416. Location sensor 416 can be a GPS based system. User input device 420 receives information from the user of the beacon regarding the user's publication.

In some embodiments, beacon users can constrain visibility in the information landscape by issuing policies for physical parameters such as geographic distance, browser type, or declarations that the browser presents.

Similarly, in some embodiments, browsers can constrain their detection of beacons using policies based on geographical parameters or information content associated with the beacons, and/or landscape services can constrain their views of a browser and the visibility of a beacon based on policies established in the particular landscape service. In some embodiments, landscape services can constrain the exchange of information between its peers based on policies established in the landscape service. For example, browsers and beacons may be required to present appropriate digital certificates attesting to their (or their users') membership in certain groups or satisfaction of certain requirements in order for certain types of information to be displayed. It will be appreciated, however, that any suitable policies can be employed. A variety of systems and methods can be used to implement and enforce such policies, such as the systems and methods described in commonly assigned, co-pending U.S. patent application Ser. No. 11/583,693 (Publication No. 2007/0180519) ("the '693 application"), and/or the service orchestration technology described in commonly assigned U.S. patent application Ser. No. 10/863,551 (Publication No. 2005/0027871) ("the '551 application"). The entirety of both the '693 application and the '551 application are hereby incorporated by reference into the present application.

In some embodiments, content associated with a beacon can be provided by the user of the beacon on an ongoing basis from the beacon itself. Content can also be associated with the beacon by the user using a tool to associate externally hosted information with the beacon. For instance, the user can declare that a beacon is associated with a URL. In one embodiment, the content associated with a beacon can be provided to the browser as a part of the view the browser receives from the landscape service.

In some embodiments, users represent their beacon(s) to one or more landscape services in the form of computed or cached multimedia images. The landscape service may also provide a default representation of the beacon to the browser depending on the specific policies that are in force. A beacon may also register its representation with third party services.

In some embodiments, content associated with a beacon may also be associated with a multimedia image. This representation may be provided by the beacon, or a third party service.

Depending on the beacons, their position, their associated presentation, their associated content, the content's presentation, and/or other physical and/or operational parameters, the browser may choose to represent a beacon or the beacon's associated content as a separate multimedia image.

In one embodiment, a user of a browser can signal a desire to change view back to the landscape service via the browser. The user can also signal intent to change viewing direction, and/or intent to follow hyperlinks, to the browser.

In one embodiment, the user of a browser pages through the representations of beacons on the browser's calculated presentation. As the calculated presentation is updated, beacon representations appear and disappear from the presentation. In one embodiment, the user can freeze the update using signaling events, and the user can follow hyperlinks in the presentation, in which case the browser will behave as a standard web browser, or call on a web browser to follow the link.

In some embodiments, the landscape service provides for exchange of rights-protected content by storing content associated with beacons. For example, the systems and methods described in the '551 and '693 applications can be used to facilitate this process. Content exchange and further browsing of the content can be guided by the policies associated with the content.

Figure 5:
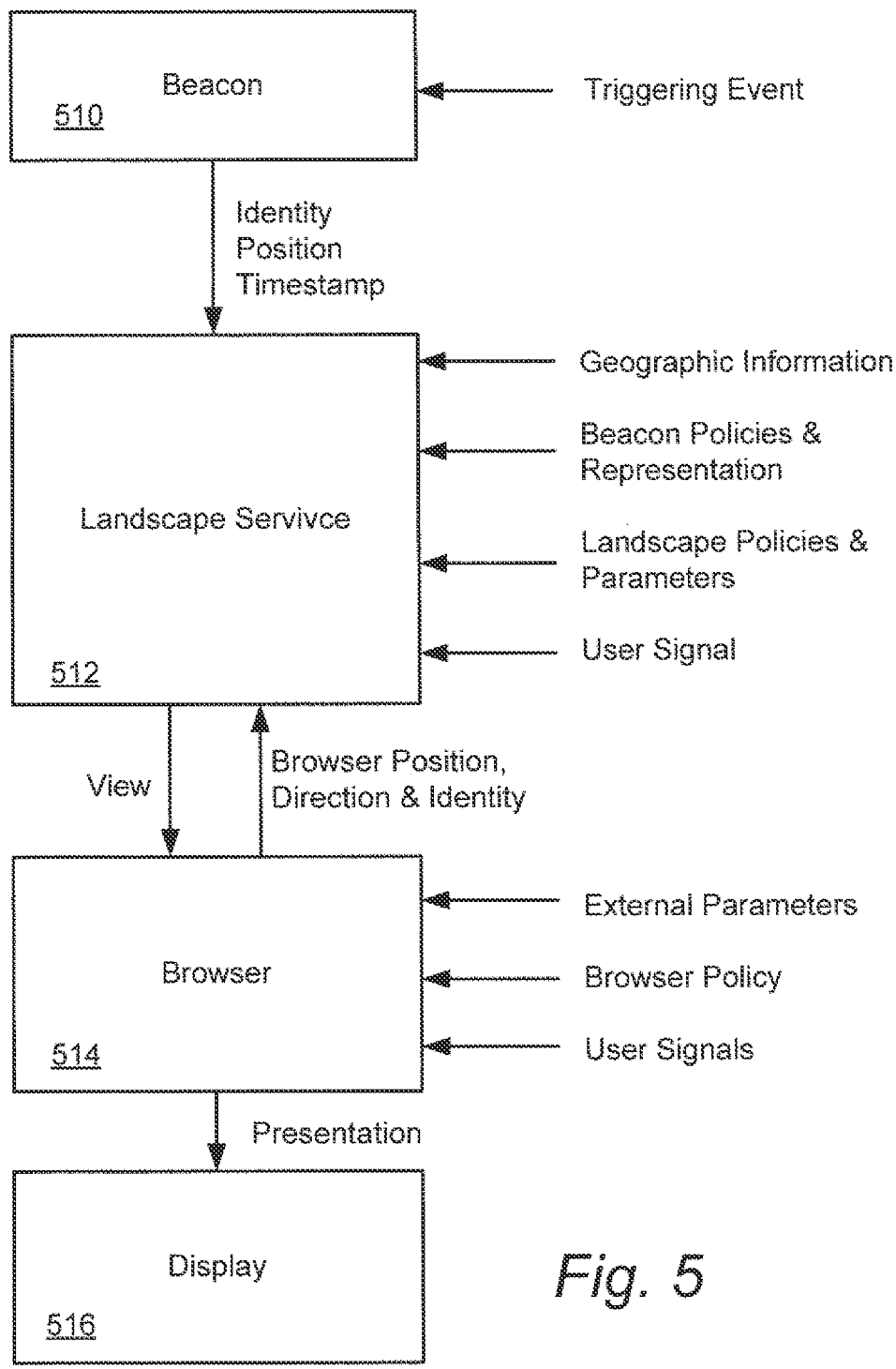
FIG. 5 shows an example of the components of a presentation calculation in accordance with some embodiments.

FIG. 5 shows an example of the components of a presentation calculation in accordance with some embodiments. As shown in FIG. 5, an event triggers a beacon 510 to signal its identity, geographic position, and a time stamp to the landscape service. This event could be, for example a simple periodic timer, or it could be an action from the user of the beacon. The landscape service 512 calculates views using, for example, input from the beacon, geographic information such as elevation and terrain type, policies the beacon has registered with the landscape service, policies of the landscape service, and external parameters that the landscape service 512 can determine from third party resources, signals from the user indicating preferences, and/or browser geographic position and viewing direction.

The browser 514 provides the landscape service 512 with a position, direction and its identity. Browser 514 provides the display 516 with a presentation. In one embodiment, the calculation of the presentation uses external parameters such as images from the location of the browser, representations of the location obtained from third parties, the current browser policy, and/or user signals indicating display preferences. Finally, as shown in FIG. 5, the display renders the presentation in an understandable format to the user.

Example—Micropublishing

Micropublishing allows a user to define and discriminate the geographic area that the user is publishing his or her data too. Micropublishing is somewhat similar to a user walking around with a boom-box with the user's own content. The difference is that other people can listen to the user's collection across the street if they want, or fully ignore it if they choose to.

As the user travels, the user can advertise the user's interests and goods to other people within a certain proximity to the user. The user can also easily identify people who share the user's interests. The user has the benefit of being right there if someone finds the user's content interesting.

The following is an example that illustrates a user publishing content to his or her consumer electronics device.

FIG. 6 shows an example of user authored content, according to embodiments. In this example, the user wants to publish a harmonica tune. The tune is considered low quality and is given away for free. The user records the tune on a personal computer or other recording device, and writes a small HTML formatted page 610 about the content.

Next, the user performs a binding action where a beacon device 620 is associated with the content 610. The binding action is represented by arrow 614. This binding is then registered with the landscaping service or services that the user chooses to publish to. This can be accomplished via the internet or some other communication system between the user's personal computer and the landscaping service. Alternatively, the registration can be performed by the beacon device communicating with a landscape transceiver.

The user then puts the beacon device 620 in his pocket, and takes a walk. While the user is doing this, beacon device 620 periodically updates the landscaping service with the user's geographical location via a landscape transceiver 630. The update is represented by arrow 624.

While the user is busy publishing his content to the immediate area, a second user browses his surroundings for something interesting. FIG. 7 shows an example of a browser displaying the first user's content, according to one embodiment. Browser device 710 is a handheld wireless device having a large color display 712 on which the second user can view content and other information. The browser device 710 includes various buttons for accepting user input such as digital button arrays 730 and 734, analog joy stick or disk 732, and the like. According to a further embodiment, the display 712 is touch sensitive to accept user input directly on the display screen. Browser device 710 also includes audio speakers and/or a headphone jack for playing music or other audio content. According to some embodiments, browser device 710 also includes a camera 750 mounted on the reverse side for capturing still and/or video images. In this example, display 712 shows a still image or a video image of the first user 720, along with the small HTML page 722 that corresponds to the page 610 shown and described with respect to FIG. 6. The image 720 could be generated directly using a camera mounted on the browser device 710, in the case where the browser device 710 is pointed in the direction of the first user. According to another embodiment, the image 720 could be generated by the first user himself as part of the content creation step.

In the example described with respect to FIGS. 6 and 7, the landscaping service provides a mapping service between geographically aware devices, namely the beacon and browser device, and the information or digital content attached to them.

Client devices, such as browser device 710 submit geographic position, direction, and identity information to the landscaping service. When a display request arrives at the landscaping service, the landscaping service computes the information landscape that the client will see. The computation involves, among other things, a client's desired visibility and the client's desired range of vision. For example, on browser device 710 button array 730 could be used to accept the user's input for desired angle of view (or zoom), as well as left-right or up-down navigation. Alternatively, or in addition, other discriminants may be applied.

The information that the landscaping service associates with the geographic location of the client can be collected from one or more of various sources. Among them are URLs, plain or formatted text, audio content, video content, or other forms of content that can be rendered.

Once the information landscape has been computed, the landscape information is sent back to the client where the information landscape is displayed via the client's browser device such as device 710.

Clients can subscribe to any number of landscaping services, and can make their geographic location known to those services either directly, or via some proxy.

Example—Browser Operation

In one embodiment, a browser is used that is aware of its geographic location and the direction it is pointed in. In some ways the browser can be thought of as a camera that takes photos of the cyber space around you.

Figure 8:
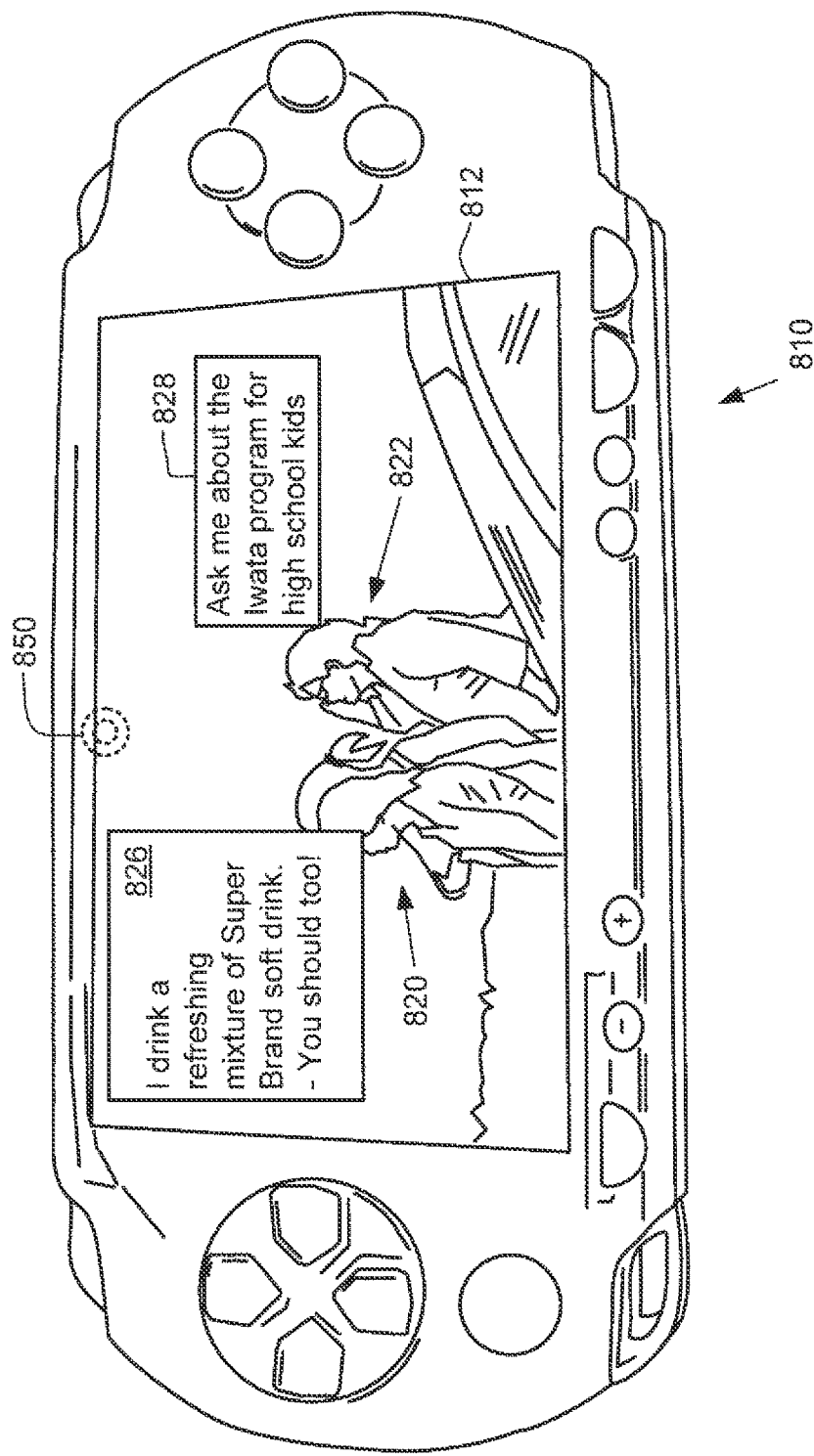
FIG. 8 shows and example of a browser device displaying content from a number of users, according to an embodiment.

FIG. 8 shows and example of browser device displaying content from a number of other users. Browser device 810 includes a camera 850, and, on the reverse side of the device, a display 812 for viewing content. In this example, a browser user is sitting around, people watching using device 810. A group of people with different labels comes walking by. One of them, person 820, is advertising beverages in small page 826. Another, person 822, is advertising an exchange program for high school kids via small page 828. As shown in display 812, the user catches the scene using browser device 810.

Figure 9:
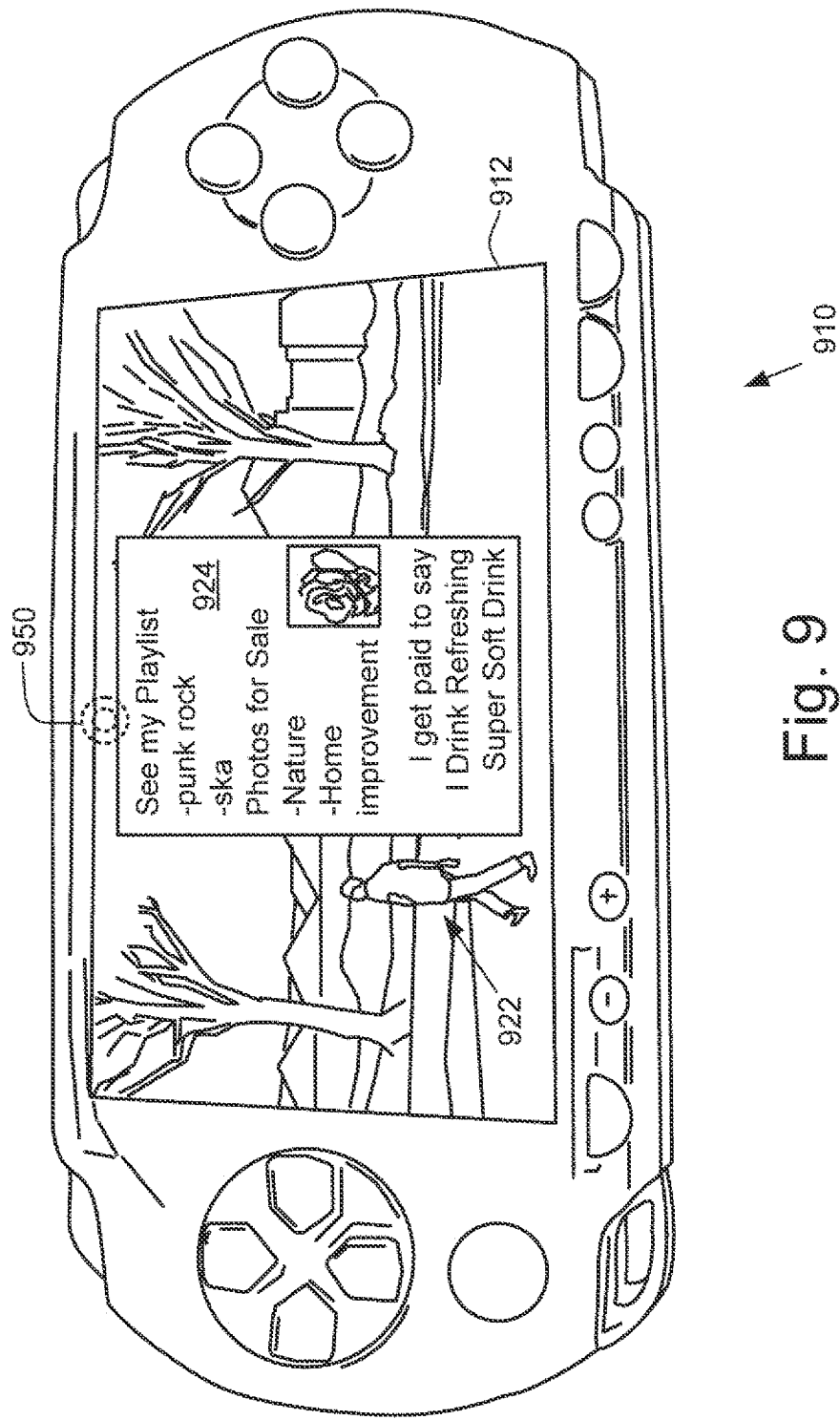
FIG. 9 shows an example of a browser device being used to spot an individual that seems to match the interests of a user, according to an embodiment.

FIG. 9 shows an example of a browser device being used to spot an individual that seems to match the interests of the user. Browser device 910 includes display 912 for viewing content and a camera 950 mounted on the reverse side of device 910 from the display 912. Further, device 910 is able to capture and save "snapshots" of the cyberspace around the browser user. Using device 910, the browser user spots an individual 922 that seems to match the interests of the user. For example, individual 922 might be in the same age group, the same socio-economic strata, and/or the like. The user of browser device 910 then snaps a quick still of the cyberspace around the individual, as shown in the display 912, including the content page 924 of individual 922. Later, when the user arrives home, the user reviews the saved snapshot, and a sale of digital images between the individual 922 and the user can be consummated.

Figure 10:
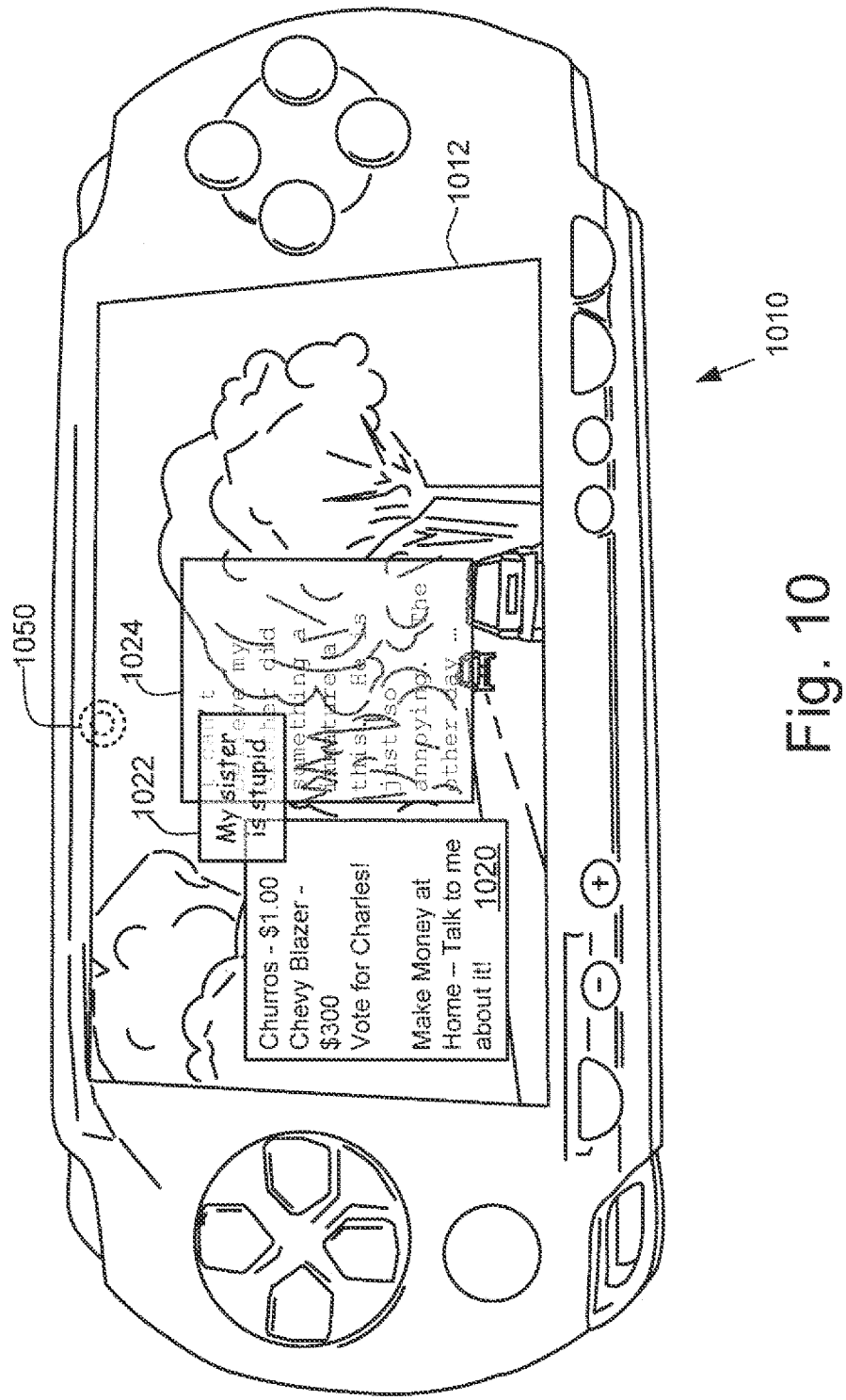
FIG. 10 shows an example of a browser device having stacks of pages according to one embodiment.

FIG. 10 shows an example of a browser device having stacks of pages according to another embodiment. In this example, a user of browser 1010 is driving down a street. As shown in FIG. 10, another user has published a page 1020 displaying things to sell. In the background a brother and sister are squabbling, in pages 1022 and 1024. As shown in FIG. 10, the browser display stacks the pages 1020, 1022 and 1024 and a page fades away if the content will not fit in the allotted area of display 1012. Browser 1010 also includes a camera 1050.

Figure 11:
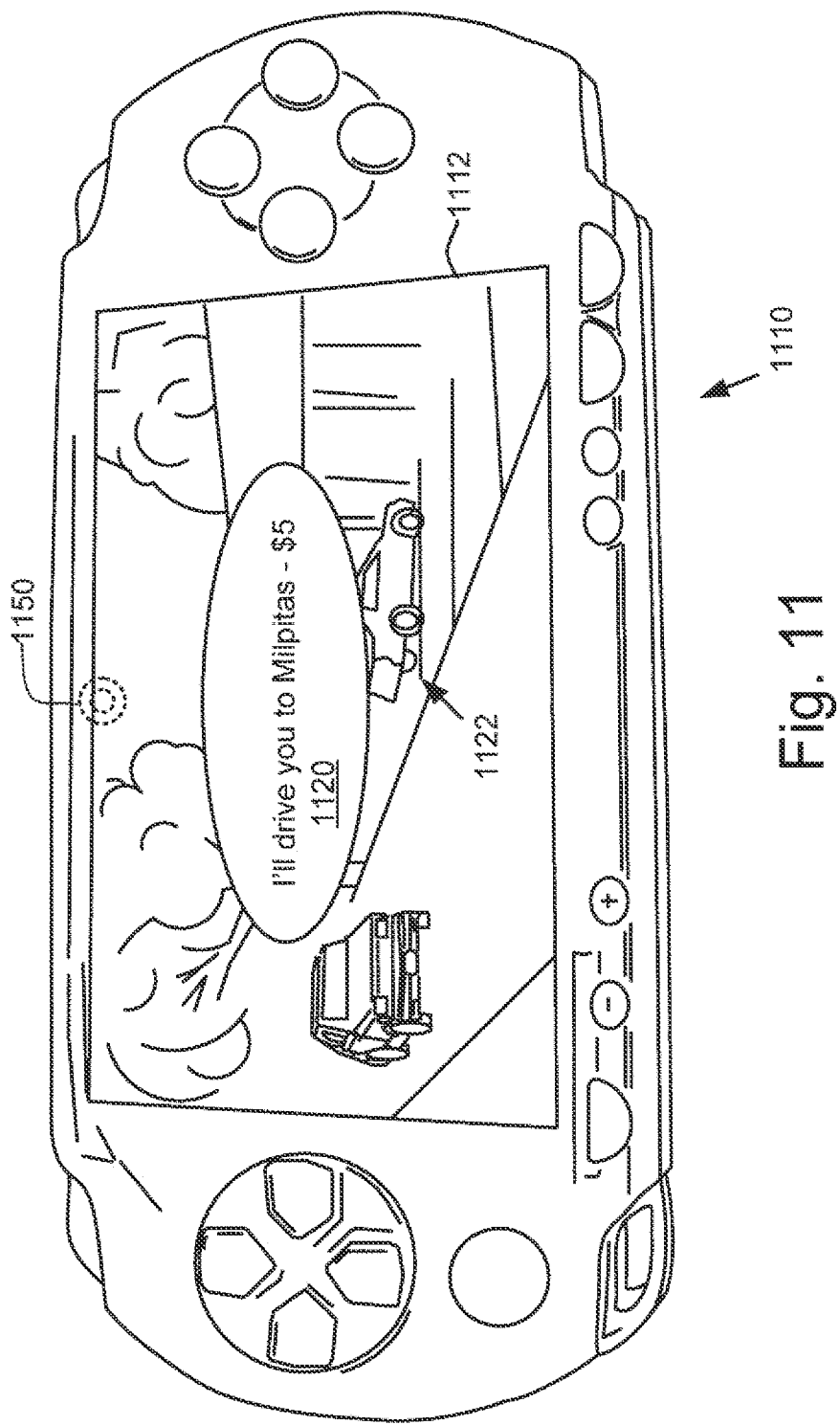
FIG. 11 shows an example of a browser being used to look for a particular service.

FIG. 11 shows an example of a browser being used to look for a ride, according to another embodiment. In this example, the user of browser 1110 is looking for a ride. In this case, browser 1110 is a combination device including a beacon, and also includes a display 1112 and a camera 1150. The user creates a short page indicating that the user needs a ride to Milpitas and binds the message to the browser/beacon device 1110. The message is published via a landscape service for viewing by other nearby browsers. The user waits in a place where people and cars congregate—for example, a gas station. Another user 1122 is parked and notices the first user's need for a ride. User 1122 responds by publishing content message 1120. The first user then views the message on screen 1112 of the browser/beacon 1110.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A method for publishing digital content on a mobile electronic system, the method comprising:
   receiving an indication of a location of the mobile electronic system;
   retrieving, based at least in part on the indication of the location of the mobile electronic system, content information associated with at least one registered location;
   determining that one or more requirements articulated in a first policy generated by a first user of the mobile electronic system and a second policy generated by a second user associated with the at least one registered location are satisfied, wherein determining that the one or more requirements are satisfied comprises determining that the mobile electronic system possesses a digital certificate; and
   displaying, based on determining that the one or more requirements are satisfied, the content information on a display of the mobile electronic system overlaid on an image of a physical landscape captured by a camera system associated with the mobile electronic system at a position corresponding to the at least one registered location.

2. The method of claim 1, wherein retrieving the content information comprises determining that the at least one registered location is within a threshold distance from the location of the mobile electronic system.

3. The method of claim 2, wherein retrieving the content information is based on determining that the at least one registered location is within a threshold distance from the location of the mobile electronic system.

4. The method of claim 1, wherein the indication of the location of the mobile electronic system comprises global positioning system location information.

5. The method of claim 4, wherein the mobile electronic system comprises a global positioning sensor system configured to generate the global positioning system location information.

6. The method of claim 1, wherein the indication of the location of the mobile electronic system comprises an indication of a desired range of vision.

7. The method of claim 1, wherein the indication of the location of the mobile electronic system comprises an indication of a desired visibility.

8. The method of claim 1, wherein the mobile electronic system comprises the camera system.

9. The method of claim 1, wherein the method further comprises determining that a third policy has been satisfied, wherein displaying the content information is further based on determining that the third policy has been satisfied.

10. The method of claim 9, wherein the third policy is generated by a landscape service system.

11. The method of claim 1, wherein the one or more requirements comprise a requirement that the user of the mobile electronic system demonstrate membership in a group.

12. The method of claim 1, wherein the content information comprises one or more images.

13. The method of claim 1, wherein the content information comprises text content.

14. The method of claim 1, wherein the content information comprises video content.

15. The method of claim 1, wherein the content information comprises audio content.

16. The method of claim 1, wherein the content information comprises at least one pointer to content stored on a content information system.

17. The method of claim 16, wherein the at least one pointer includes at least one URL.

* * * * *